United States Patent
Uchimura

(10) Patent No.: US 6,578,805 B2
(45) Date of Patent: Jun. 17, 2003

(54) MICROPHONE HOLDER INSTRUMENT, AND SUPPORT PLATE FOR SUPPORTING AT LEAST A PAIR OF MICROPHONE HOLDER INSTRUMENTS

(75) Inventor: Satoshi Uchimura, Sagamihara (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 0 days.

(21) Appl. No.: 10/058,465

(22) Filed: Jan. 28, 2002

(65) Prior Publication Data

US 2002/0104945 A1 Aug. 8, 2002

(30) Foreign Application Priority Data

Feb. 6, 2001 (JP) ........................................ 2001-029441

(51) Int. Cl.[7] .................................................. A47F 5/00
(52) U.S. Cl. .................................... 248/309.1; 248/74.1
(58) Field of Search ........................... 248/316.1, 309.1, 248/316.7, 535, 74.1

(56) References Cited

U.S. PATENT DOCUMENTS

| | | | | |
|---|---|---|---|---|
| 3,665,490 A | * | 5/1972 | Oskar ........................... 381/118 |
| 4,346,501 A | * | 8/1982 | Saiya .......................... 174/135 |
| 4,466,596 A | * | 8/1984 | Cohen .................... 248/231.41 |
| 6,305,654 B1 | * | 10/2001 | Schmidt et al. ........ 248/229.24 |
| 6,386,377 B1 | * | 5/2002 | Yeoman ...................... 211/173 |
| 2002/0066837 A1 | * | 6/2002 | Dunbar ..................... 248/122.1 |

FOREIGN PATENT DOCUMENTS

GB 2235851 A * 3/1991 ............ H04R/1/32

* cited by examiner

Primary Examiner—Leslie A. Braun
Assistant Examiner—A. Joseph Wujciak
(74) Attorney, Agent, or Firm—Welsh & Katz, Ltd.

(57) ABSTRACT

A microphone holder instrument for removably holding a microphone hung from the upper thing such as a ceiling, and a combination of at least the pair of microphone holder instruments and a support plate for supporting said microphone holder instruments. The microphone holder instrument comprises a plate member formed in a generally boomerang shape with its sides that comprise respective first and second arms, a microphone holder unit provided to the first arm, and a plurality of cutout portions provided to the second arm for making arrangement in the sigmoid curve and lock of a microphone cord therebetween for prevention of the escape from the second arm. The support plate has at least one locking part for connecting said microphone holder instrument thereto such that the microphone is oriented to a predetermined direction.

13 Claims, 5 Drawing Sheets

MICROPHONE HOLDER INSTRUMENT, AND SUPPORT PLATE FOR SUPPORTING AT LEAST A PAIR OF MICROPHONE HOLDER INSTRUMENTS

FIELD OF THE INVENTION

The present invention relates to a microphone holder instrument for holding a microphone, particularly to a microphone holder, which is utilized for microphone(s) hung from the upper thing such as ceiling through the cord. In combination of the microphone holder instrument and a support plate for supporting the microphone holder instrument, such the microphone is applied to both of one hung from the upper thing and one set on a microphone stand.

BACKGROUND OF THE INVENTON

When some microphones are used for collected or recorded sounds in concert halls or theaters, and so on, they are often hung from the upper thing such as a ceiling through respective cords. In this case, when a super-directional microphone is used, it requires setting thereof in the properly angled direction in which it can collect or record sounds. This needs a holder for cord-hung microphone. With reference to FIG. 8, the descriptions of the prior arts are given.

As an example, a gun-like type microphone M (FIG. 8) is hung. To position the microphone M in the air at the desired angle, a microphone holder 1 is utilized. With conventional construction of the microphone holder, a wire is coated with resin such as polyvinyl chloride (PVC), and thereafter coiled (spiraled) to form a microphone holder 1.

The microphone holder 1 has first and second wound parts 2, 3 to hold the proximal portion of the gun-like type microphone M, and to pass a cord extending from the microphone M, respectively. In the holder, the first wound part for hold of the microphone, and the second wound part for passage of the cord, respectively, are at the leading, and trailing portions with respect to the center. The intermediate wire (between the first and second wound parts) of the holder 1 is not wound, and may be freely bent. The two wound parts of the holder function to fixedly position the microphone hung dangling from the ceiling in the air, and the intermediate wire functions to direct the microphone to the desirably collected and recorded sound or vocal sound and so on.

Such the microphone holder had problems in the producing, packing, and handling processes.

In the producing process, the coating of the wire with the resin such as polyvinyl chloride (PVC)and the curling of the resin-coated wire raises the cost of production, which is down side.

In the packing process, the putting of the holder with a resin-coated surface in a poly bag (polyethylene bag) creates a difficulty in the packing works because of clinging of the poly bag to the resin coated surface of the holder with the positive electricity.

In the handling process, the location of the cord C of the microphone M into the holder creates a difficulty in the installing works because of the troublesome insertion of the cord C into a hole formed by the caracole of the second wound part.

By allowing the microphone holder to have a facility of the connection to the microphone stand, the microphone will be adaptable to both of hung one and mounted one. If the microphone stand has a facility for supporting two or more microphone holders for hung-type microphone, it is very convenient. This will be employed for a stereo microphone or surround systems.

OBJECTS OF THE INVENTION

In order to accomplish solutions to the foregoing problems, the principal object of the present invention is to provide a microphone holder instrument having a simple structure, facilitating the handling, and supplying the requirement cheaply.

It is also an object of this invention to provide a support plate for easily connecting supported paired microphone holder instruments to a microphone stand as employed to for example, stereo or surround recording.

SUMMARY OF THE INVENTION

The forgoing first and second objects are accomplished by providing a microphone holder instrument and a support plate, which have following structures, respectively.

Firstly, the microphone holder instrument according to the present invention comprises a generally boomerang-shaped plate member, and a holder unit for hold of a microphone. The generally boomerang-shaped plate member consists of first and second arms, which are formed by respective sides thereof with crossing to each other at the predetermined angle.

To the first arm, said holder unit is provided, in order to hold the microphone at the predetermined angle. The second arm includes at least two cutout portions for inserting and holding the microphone's cord thereinto. The inserted cord is arranged in a sigmoid curve with lock by each of the cutout portions so that it cannot escape from the first arm.

The holder unit according to the present invention comprises a base, a shaft extending from the base, and a generally C-shaped holder part extending from the base on the opposite side from the shaft for removable hold of the microphone such that the microphone crosses across the axis extending from the shaft. The first arm includes a bearing, which is employed to the shaft. The holder part may be turned to up and down through the shaft. This allows the microphone to be oriented to the positions at various angles, although the foregoing first arm has a position at the fixed angle to the second arm.

Each of the cutout portions of the foregoing second arm has a shape of which gives "T" 90 degrees turn clockwise on the left side of the second arm or counterclockwise on the right side. From the leading end of "T" to another line, an inlet path is drawn for insertion of the microphone's cord. This facilitates the insertion of the microphone's cord into each of the cutout portions, and provides the facility for preventing escape of the cord form the second arm.

Secondly, the foregoing microphone holder instrument may be arranged in a pair for use of a stereo microphone system. Such the pair of microphone holder instruments may be connected to a fan-shaped support plate at the connection between the first and second arms. The fan-shaped support plate with the pair of microphone holder instruments may be connected to a microphone stand such as a tripod stand. The number of the microphone holder instrument is not limited to two.

The fan-shaped support plate has a plurality of locking parts, which allow each one of the microphone holder instruments to be connected thereto and supported thereon. Paired locking parts on both sides of the fan-shaped support base plate provide determination of setting angle of the paired microphone holder instruments.

The paired stereo microphones, which are held by respective microphone holder instruments, may be oriented to the right and left at various stereo angles, depending on a combination of the plural locking parts that are provided on both sides of the fan-shaped support plate.

For the selected stereo angle, the support plate may have various angle indications for indicating any setting angles produced by the combined right and left locking parts.

BRIF DESCRIPTION OF DRAWINGS

PREFERRED EMBODIMENTS OF THE PRESENT INVENTION

Referring to FIGS. 1 to 5, there are shown a microphone holder instrument according to an embodiment of the present invention, which will be described below.

Figure 1:
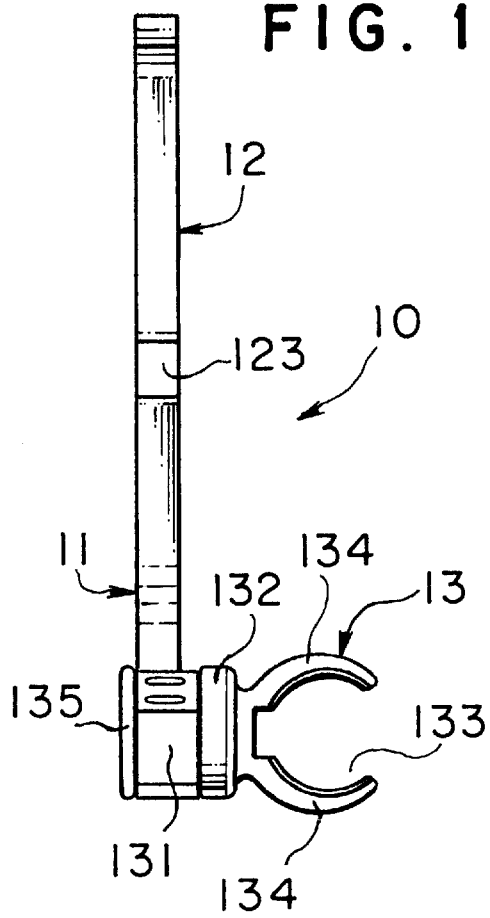
FIG. 1 is a front view of an embodiment of a microphone holder instrument according to the present invention.
Figure 2:
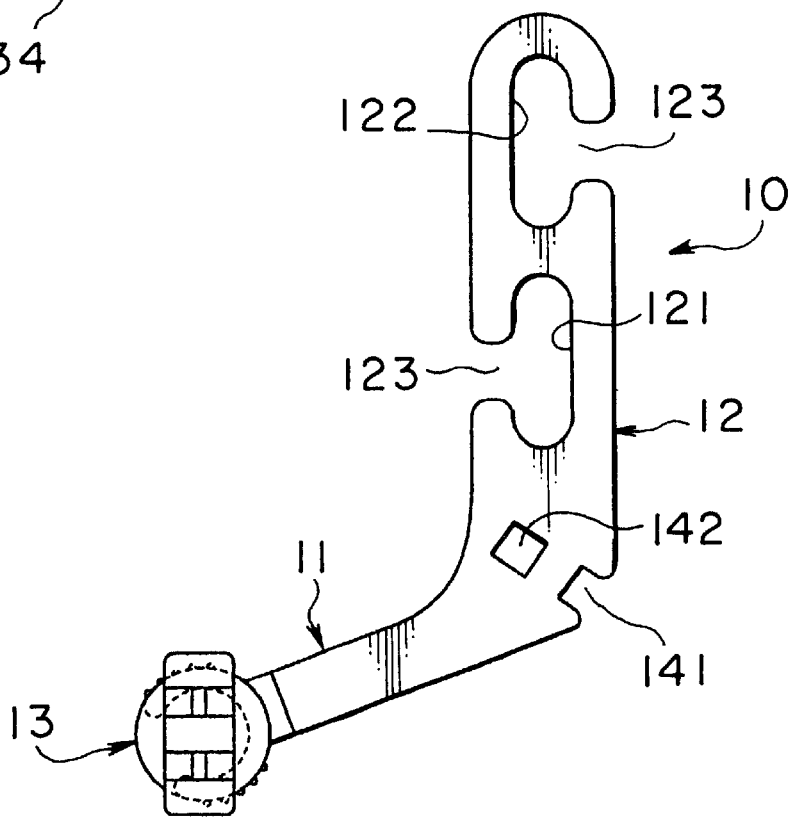
FIG. 2 is a side view of the embodiment of the foregoing microphone holder instrument.
Figure 3:
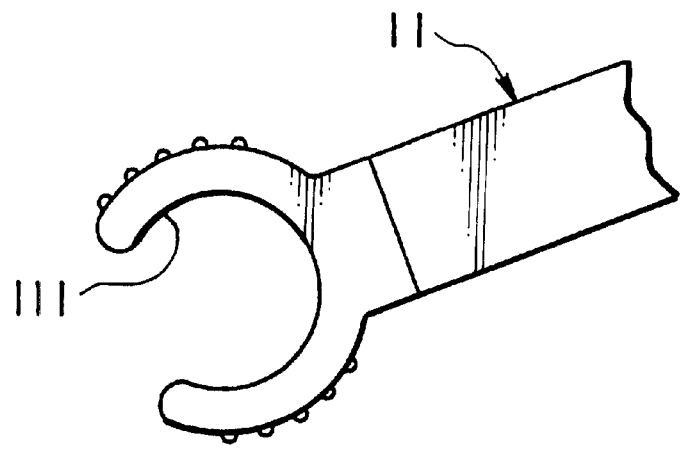
FIG. 3 is a side view of showing a bearing of the microphone holder instrument.

FIGS. 1 and 2 are front and side views of the microphone holder instrument, respectively. As shown in FIG. 1, a microphone holder instrument 10 comprises a first arm 11, a second arm 12, and a holder unit 13 for hold of a microphone. The first and second arms 11 and 12 are connected to each other at one of the ends with an integral formation to produce a generally boomerang-shaped plate member, as shown in FIG. 2. The first arm 11 has a generally C-shaped bearing connected or integrally formed therewith on the side of its leading end, as shown in FIG. 3.

Figure 4:
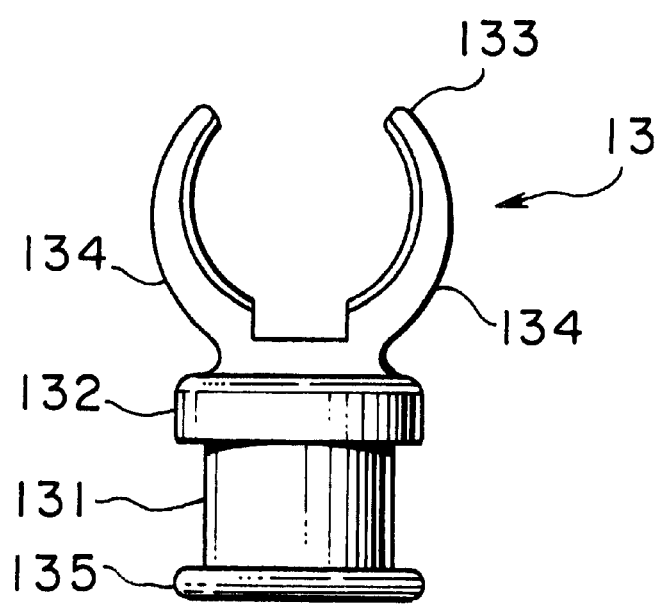
FIG. 4 is a side view of showing a microphone holder unit of the microphone holder instrument.

Referring to FIG. 4, the holder unit 13 comprises a revolving shaft 131, a base 132 integrally formed or connected with the revolving shaft 131 on the side of one end thereof, and a generally C-shaped holder part 133 integrally formed or connected with the base on the opposite side from the revolving shaft 131. Therefore, the revolving shaft, base, and C-shaped holder part are arranged in series.

The C-shaped holder part 133 comprises a pair of bent members 134, 134 for fitting a microphone therebetween. The revolving shaft 131 is fitted into the generally C-shaped bearing 111 from the direction crossing it, and the bearing 111 holds the revolving shaft 131 with its elasticity, as shown in FIG. 1. The revolving shaft has a flange 135. The flange 135 prevents coming out of the revolving shaft 131.

The generally boomerang-shaped plate member 10 has first and second cutout portions 121 and 122 for insertion of the microphone's cord C from opposite sides of the second arm 12, as shown in FIG. 2. The first cutout portion 121 has a shape of which gives "T" 90 degrees turn clockwise on the left side on the second arm 12, while the second cutout portion 122 has a shape of which gives "T" 90 degrees turn counterclockwise on the right side. The first and second cutout portions 121 and 122 have inlet paths 123, 123 for insertion of the microphone cord C, respectively. For the microphone cords C being inserted, three or more cutout portions may be provided.

Furthermore, the plate member 10 also has a dent 141 traversing connection between the first and second arms 11 and 12 at its corner, and a hole 142 next to the dent 141. The dent and hole 141 and 142, respectively, are a groove, and an opening where the holder for microphone is held, as described below (See FIG. 6).

Figure 5:
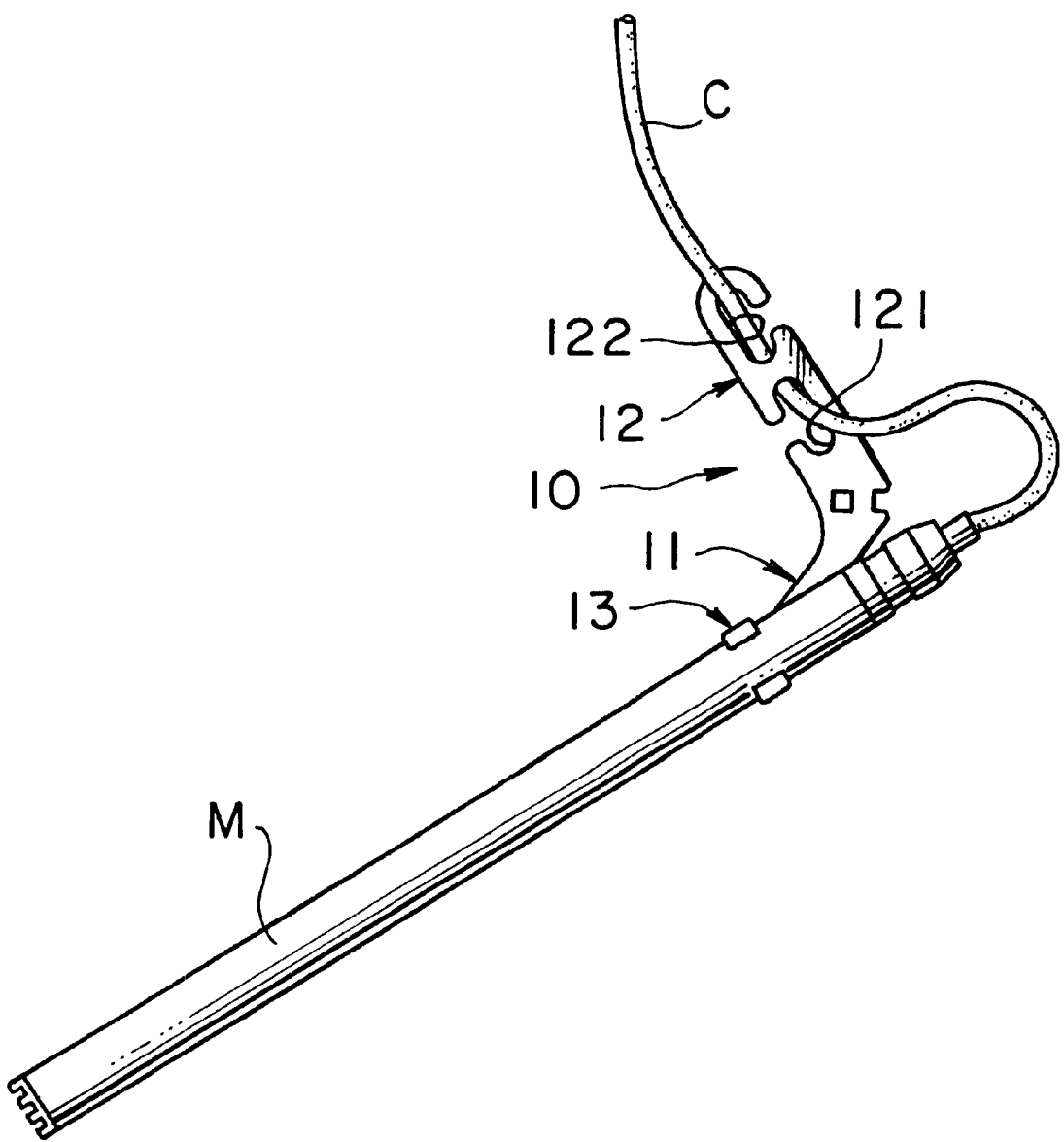
FIG. 5 is an oblique view of the foregoing microphone holder as used.

Referring to FIG. 5, an example of how the foregoing microphone holder is used, is shown. An operator prepares a gun-type microphone M hung from the upper thing such as a ceiling through its cord. The operator inserts or fits the gun-type microphone between the bent members 134, 134 of the holder unit 13 of FIG. 4 or into a hole formed by the bent members, and then the microphone is secured to the holder unit 13 as shown in FIG. 5.

The operator may turn the gun-type microphone M rotatably held by the bent members 134, 134, clockwise or counterclockwise. In addition, the operator may turn the shaft 131 of the holder unit 13 to tilt the microphone M up and down, grasping the microphone body M held by the bent members 134, 134. The tilted microphone M has its stable position by engagement of the C-shaped bearing 111 with the revolving shaft 131.

Then, the operator may insert the microphone cord C into respective "T" cutout portions 121 and 122 through the inlet paths on the side of respective lateral edges of the second arm 12. In each of the inlet paths 123, 123(See FIG. 1), the code C on the side of the "T" cutout portions 121 is inserted from one lateral edge of the second arm toward another lateral edge, while the code C on the side of "T" cutout portion 122 is inserted from the former to the latter. Hence, the code C is arranged in a sigmoid curve. This contributes to prevention of the escape of the cord C from each of the "T" cutout portions 121, 122. In addition, the insertion of the cord C from each of the inlet paths 123, 123 of respective "T" cutout portions 121, 122 is very easy.

Figure 6:
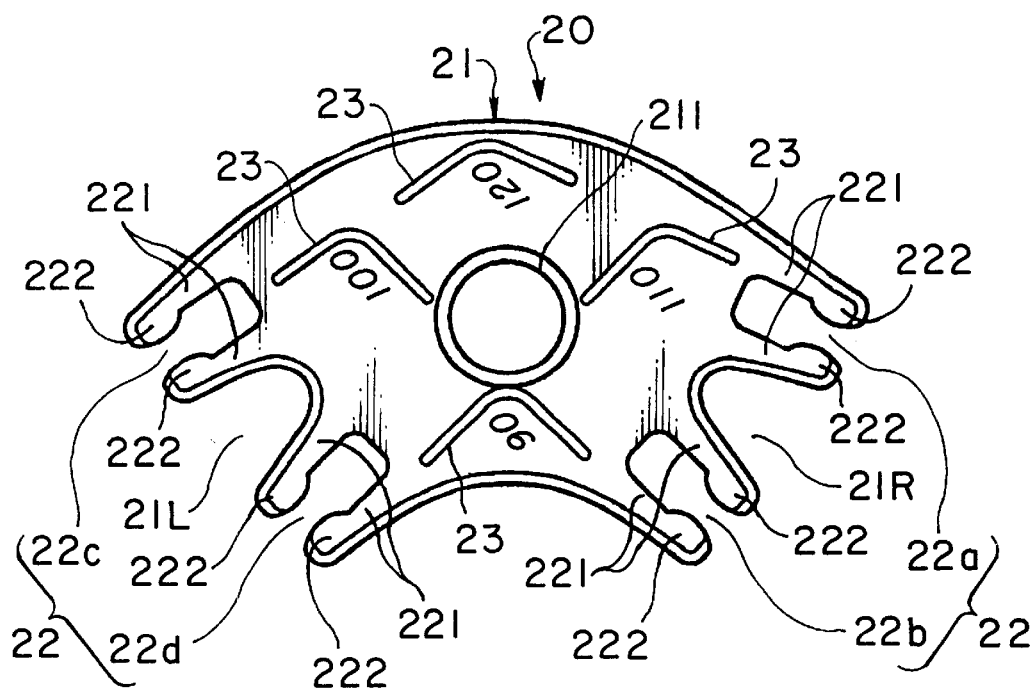
FIG. 6 is a front view of a support plate for supporting the microphone holder instrument.
Figure 7:
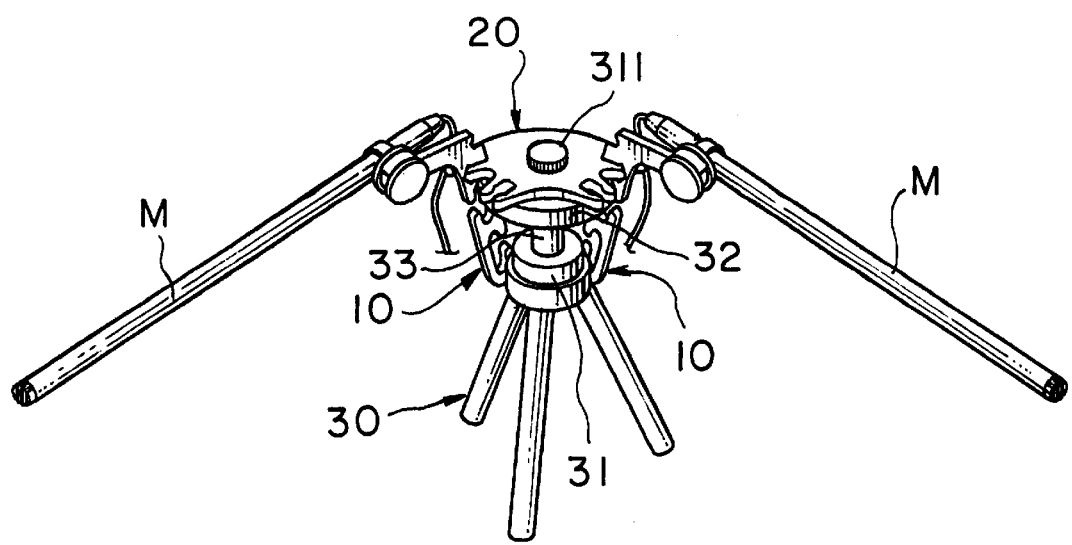
FIG. 7 is an oblique view of the embodiment where the foregoing microphone holder instruments in pair are connected to the support plate.
Figure 8:
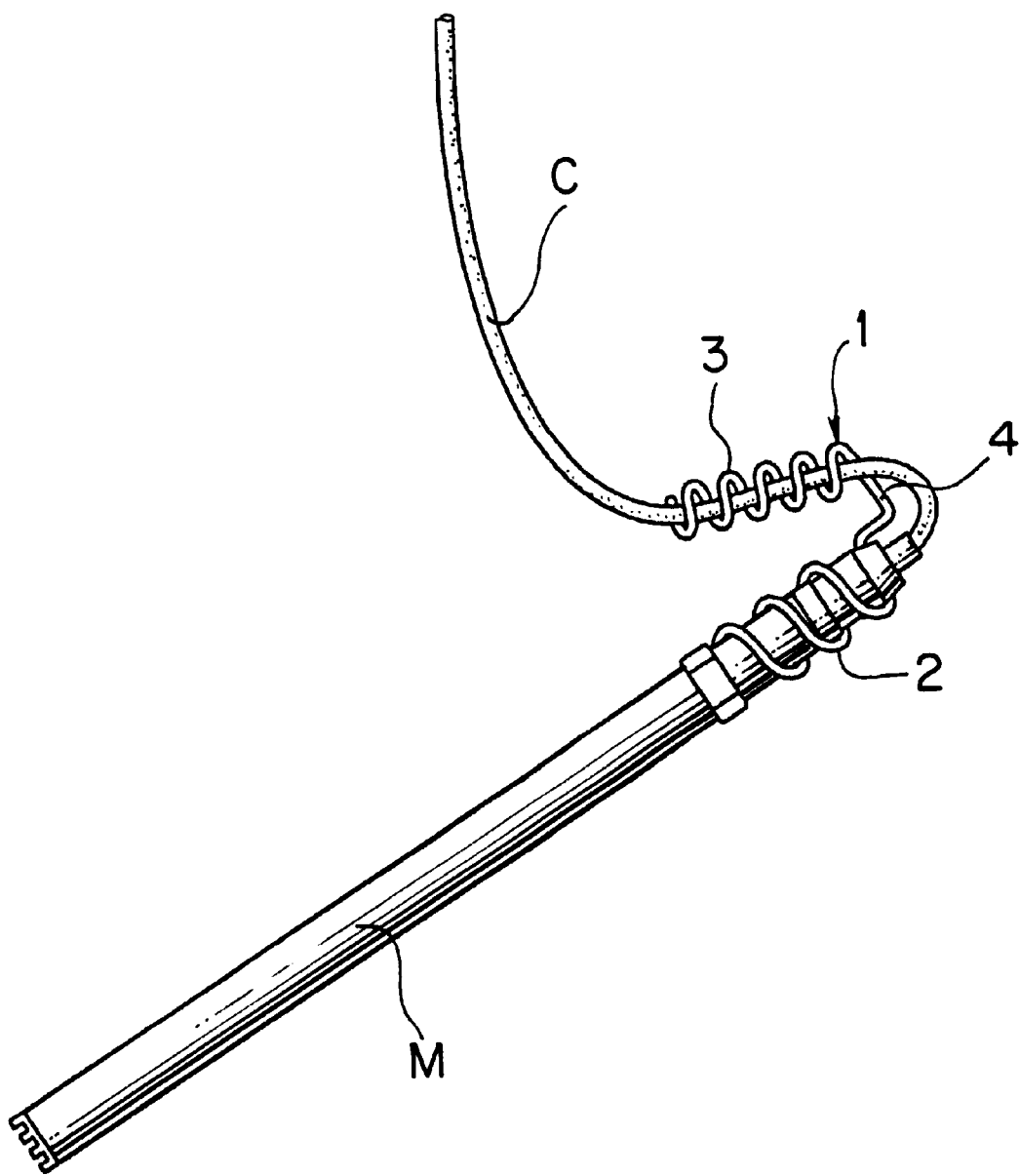
FIG. 8 is an oblique view of showing a conventional microphone holder.

FIGS. 6 and 7, respectively, are plain and perspective views of showing the embodiment of the present invention, which are directed to a pair of microphone holder instruments as applied to a stereo microphone system. Referring to FIG. 6, a stereo microphone stand 20 includes a fan-shaped support plate 21 connected thereto for supporting paired holder instruments (See FIG. 7). In addition, it includes, as shown in FIG. 7, a tripod stand 30 for connecting the support base plate 21 thereto.

The tripod stand 30 has a first circular platform 31 and a second circular platform 32, which is of a circle having a diameter larger than the first circular platform. A cylinder 33 stands between the first and second circular platforms 31 and 32 at respective center positions.

The connection between the support base plate 21 and the tripod stand 30 is made by a combination of a female screw 211 and a male screw 311. The female screw 211 is formed in the central position of the support base plate 21. The female screw 211, into which the male screw 311 is fitted, may extend between the support plate 21 and the second circular platform 32 or the cylinder 33. Thus, the support plate 21 is connected to the tripod stand.

In more detail, the connections between the pair of microphone holder instruments and the support plate 21 are made by a combination of the dent(groove) 141 of respective boomerang-shaped plate members and the locking part 22 of the support plate 21.

The locking part 22 comprises the first locking part 22a on the right side 21R of the after part support plate 21, the second locking part 22b on the right side 21R of the anterior part, the third locking part 22c on the left side 21L of the after part, and the fourth locking part 22d on the left side 21L of the anterior part. As understood from FIG. 7, each of the microphone holder instruments is connected to one of the locking parts 22. Thus, the number of the connected microphone holder instrument is not limited to two Each of the locking parts 22a to 22d comprises a wide path formed between the intermediate portion and the distal end, and a narrow path formed between the intermediate portion and the proximal end so that an ungula 221 having a hook part 222 is formed in the trailing end on both sides inside respective locking parts 22a to 22d. The support base plate 21 has a generally V-shaped dent 24 formed between the locking parts 22a and 22b or 22c and 22d.

When each of the microphone holder instruments is connected to the support plate 21, it is forced into the locking part 22. Hence, the dents(grooves) 141 of the plate members 10 are engaged in the wide paths of the locking parts 22, while the pairs of hook parts 222 of the ungulas 221 are fitted into the holes 142 of the plate members 10, respectively.

The paired locking parts 22a and 22b, and 22c and 22d on the same side of the fan-shaped support plate 21 are inclined with respect to a central line between the paired ones such that the connected microphone holder instruments having respective gun-type microphones M are oriented to different directions from each other.

Additionally, the surface of the support plate 21 has some indications 23, which include both of the degrees of respective open angles and respective notice lines as constructed by combination of any of the foregoing locking parts. The provision of the indications 23 facilitates the selection of the desired open angles.

The foregoing arrangement of the locking parts is by way of only an example. Therefore, alternatively, the arrangement of the locking parts may be made such that a locking part is provided to the support plate 21 at the right side thereof, while a plurality of locking parts are provided to the support plate 21 at the left side thereof. It may conform to the surround system.

In addition, when each of the microphone holder instruments is connected to the support plate, the microphone may be downwardly oriented. In this case, two or more microphones are hung from the upper thing such as ceiling and held by respective microphone holder instruments, and then the microphone holder instruments may be connected to the support plate such that respective microphone may be downwardly oriented.

What is claimed is:

1. A microphone holder instrument comprising a plate member, which is of a generally boomerang shape with a predetermined central angle and comprises first and second arms forming respective sides of the boomerang, the first arm having a microphone holder unit for removable hold of a microphone at the predetermined angle, the second arm having at least two cutout portions for insertion of a cord of said microphone, the cutout portions making arrangement in the sigmoid curve and lock of the inserted cord therebetween for prevention of escape of the cord from the second arm.

2. The microphone holder instrument as defined in claim 1, wherein said microphone holder unit comprises a base, a shaft extending from said base, and a generally C-shaped holder part provided to said base on the opposite side from said shaft for removable hold of said microphone, the held microphone being located at the right angle to the axis extending from said shaft, said first arm having a bearing in which the shaft of said microphone holder unit is removably fitted so that said shaft turns therein so as to provide free orientation of said microphone to up and down.

3. The microphone holder instrument as defined in claim 1, wherein each of said cutout portions is formed in a shape of which gives "T" turn clockwise or counterclockwise to a predetermined angle, the leading end of "T" to the horizontal line being an inlet path into which said cord is inserted, the locked, inserted cord being held in the horizontal line of "T".

4. In combination said microphone holder instrument as defined in claim 1 and a support plate for supporting said microphone holder instruments arranged in at least a pair, said support plate member having a plurality of locking parts for connection of respective microphone holder instruments thereto, at the position where said first and second arms cross.

5. In combination said microphone holder instrument and said support plate for supporting said microphone holder instruments arranged in at least a pair as defined in claim 4, said support plate being connected to a microphone stand.

6. In combination said microphone holder instrument and said support plate for supporting said microphone holder instruments arranged in at least a pair as defined in claim 4, said locking parts of said support plate being arranged, respectively, at different angles from each other.

7. In combination said microphone holder instrument and a support plate for supporting said microphone holder instruments arranged in at least a pair as defined in claim 4, said locking parts of said support plate being arranged, respectively, at different angles from each other, said support plate further having a plurality of indicative elements for indicating combined angles between said paired locking parts provided on both edges thereof.

8. A support plate for supporting at least a pair of microphone holder instruments generally in the shape of a boomerang and having first and second arms, a microphone supported on said first arm, said plate formed in a predetermined shape, the plate having some edges, and at least one or more connections which comprise respective locking parts by which respective connected microphone holder instruments are supported, each of the microphone holder instruments having a microphone, said locking parts being arranged at any of said edges for orientation of said microphones of respective microphone holder instruments to any direction, and the second arm of said microphone holder instrument having at least two cutout portions for insertion of a cord of said microphone, the cutout portions making arrangement to lock the inserted cord therebetween to prevent the escape of the cord from the second arm.

9. The support plate as defined in claim 8, wherein said support plate is connected to a microphone stand.

10. The support plate as defined in claim 9, wherein said microphone stand is a tripod stand.

11. The support plate as defined in claim 8, wherein said locking parts of said support plate are arranged, respectively, at different angles from each other.

12. A support plate for supporting at least a pair of microphone holder instruments connected thereto comprising a plate formed in a predetermined shape, the plate having some edges, and at least one or more connections which comprise respective locking parts by which respective connected microphone holder instruments are supported, each of the microphone holder instruments having a microphone, said locking parts being arranged at any of said edges for orientation of said microphones of respective microphone holder instruments to any direction, said locking parts of said support plates being arranged, respectively, at different angles from each other, said support plate further having a plurality of indicative elements for indicating combined angles between said paired locking parts provided on respective edges thereof.

13. A support plate for supporting at least a pair of microphone holders comprising a plate formed in a curved shape, and at least one or more locking openings on said plate by which said connected microphone holders may be supported, each of the microphone holders having a microphone, said locking openings being arranged radially on said curved plate for orientation of said microphones of respective microphone holder instruments to any direction.

* * * * *